United States Patent
Satoh et al.

[11] Patent Number: 6,138,785
[45] Date of Patent: Oct. 31, 2000

[54] HEAVY BURDEN TRANSPORT VEHICLE

[75] Inventors: Hiroshi Satoh, Fujisawa; Giichi Matsuo, deceased, late of Tokyo; by Sachiko Matsuo, heir, Yokohama; by Yayoi Matsuo, heir, Yokohama; by Kazue Matsuo, heir, Yokohama, all of Japan

[73] Assignees: NKK Corporation, Tokyo; Dai-Ichi Electric Kabushiki Kaisha, Kanagawa, both of Japan

[21] Appl. No.: 09/322,075

[22] Filed: May 27, 1999

[30] Foreign Application Priority Data

May 28, 1998 [JP] Japan .................................. 10-147197

[51] Int. Cl.[7] .................................................. B60K 8/00
[52] U.S. Cl. .......................................... 180/305; 180/6.48
[58] Field of Search ..................... 180/305, 306, 180/307, 6.48, 6.2

[56] References Cited

U.S. PATENT DOCUMENTS

| 3,693,741 | 9/1972 | Scheverle | 180/307 |
| 4,140,196 | 2/1979 | Brewer | 180/307 |
| 4,244,184 | 1/1981 | Baldauf et al. | 180/307 |

FOREIGN PATENT DOCUMENTS

| 1-37294 | 8/1989 | Japan . |
| 4-2127 | 1/1992 | Japan . |

*Primary Examiner*—Richard M. Camby
*Attorney, Agent, or Firm*—Muramatsu & Associates

[57] ABSTRACT

A heavy burden transport vehicle comprises a plurality of wheels and hydropneumatic units each provided for each of wheels for driving each wheel, each hydropneumatic unit having a hydropneumatic motor for rotating the wheel, a hydropneumatic pump for feeding compressed operating fluid to the hydropneumatic motor, and a motor for driving the hydropneumatic pump.

4 Claims, 7 Drawing Sheets

HEAVY BURDEN TRANSPORT VEHICLE

FIELD OF THE INVENTION

The present invention relates to a transport vehicle used for transporting a burden or the like in factories, dockyards, warehouses, etc., and particularly relates to a heavy burden transport vehicle for transporting a heavy burden or load.

DESCRIPTION OF THE CONVENTIONAL ART

Figure 10:
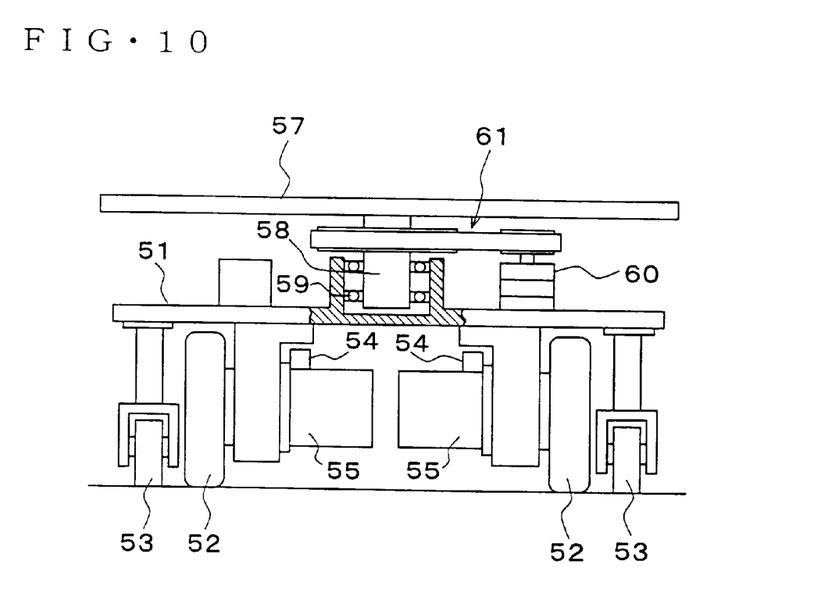
FIG. 10 is a view for explaining a first conventional example.
Figure 11:
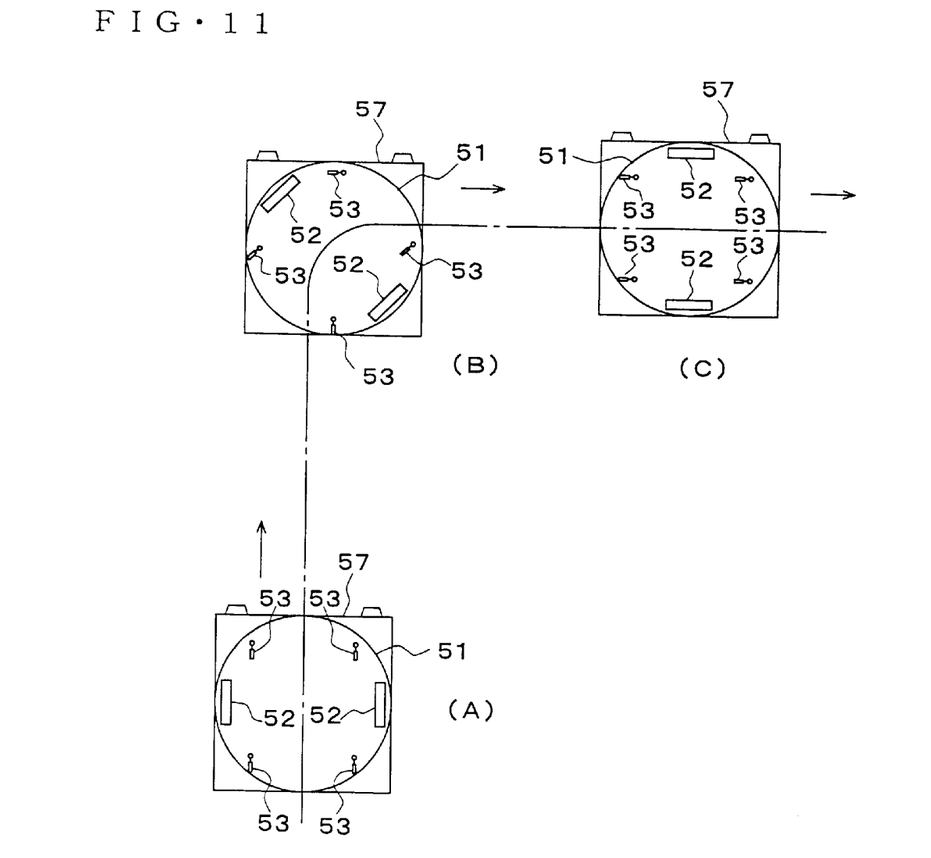
FIG. 11 is a view for explaining the first conventional example.

FIGS. 10 and 11 are explanatory views of an automatic guided vehicle disclosed in JP-4-2127 (publication of an examined utility model application). FIG. 10 is a partially cutaway front view of the automatic guided vehicle, and FIG. 11 is a schematic bottom view showing various aspects of the driving state.

In FIG. 10, the reference numeral 51 represents a vehicle body (frame). On the lower surface of this vehicle body 51, there are provided a pair of right and left driving wheels 52 and four universal wheels 53. Driving motors 55 each having an encoder 54 for detecting a rotation angle are connected to the driving wheels 52 respectively, so that the vehicle body 51 can be driven desirably through the driving wheels 52 driven by the driving motors 55.

A loading table 57 on which goods to be transported will be loaded is provided so as to be horizontally turnable on the vehicle body 51 through a rotating shaft 58 pivotally supported by ball bearings 59. In addition, a turning drive unit 60 constituted by a motor is mounted on the vehicle body 51 to rotate the rotation shaft 58 through a driving mechanism 61, so that the loading table 57 supported on the rotation shaft 58 can be turned right and left in a desired direction.

In the automatic guided vehicle thus configured, when the driving wheels 52 are individually rotated in the same direction and at the same speed by the driving motors 55 respectively, the vehicle body 51 moves straight such as (A) of FIG. 11. When the pair of driving wheels 52 are rotated in the same direction and at different speeds, or when one of the driving wheels 52 is suspended while the other driving wheel 52 is rotated, or when the pair of driving wheels 52 are rotated in different directions from each other, the direction of movement of the vehicle body 51 can be changed. For example, the vehicle body 51 can turn at right angles such as (B) of FIG. 11.

Figure 12:
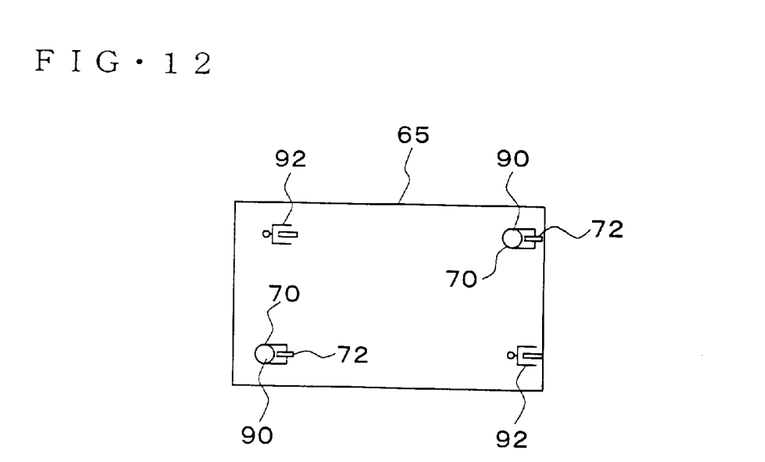
FIG. 12 is a view for explaining a second conventional example.
Figure 13:
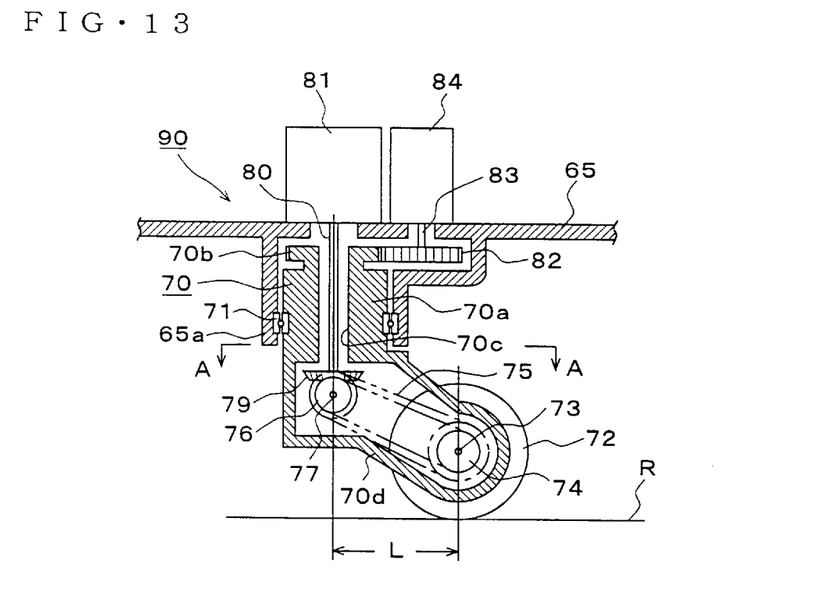
FIG. 13 is a view for explaining a main part in the second conventional example.
Figure 14:
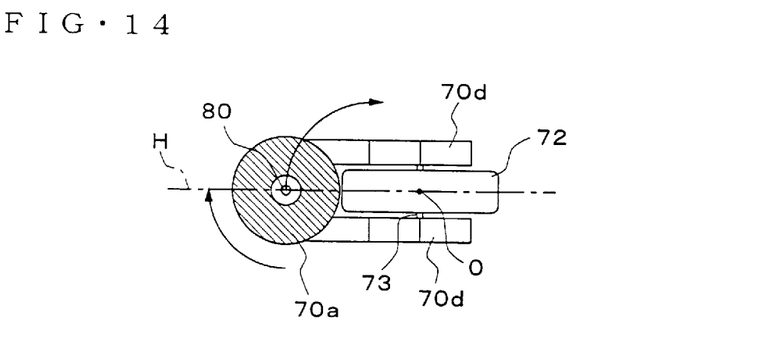
FIG. 14 is a sectional view taken on line A—A in FIG. 11.
Figure 15:
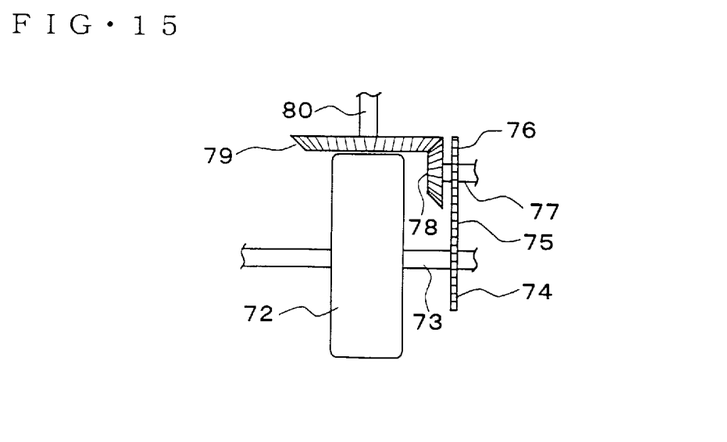
FIG. 15 is a view showing a configuration of a driving mechanism in the second conventional example.

FIGS. 12 to 15 are explanatory views of an omnidirectional movable vehicle, as another conventional example, disclosed in JP-1-37294 (publication of an examined patent application). FIG. 12 is a bottom view; FIG. 13 is a sectional view showing the configuration of a main part; FIG. 14 is a sectional view taken on line A—A in FIG. 13; and FIG. 15 is a view showing the configuration of a driving mechanism.

The other conventional example will be described below with reference to the drawings. In FIGS. 13 and 14, the reference numeral 70 represents a pivotal support member. The pivotal support member 70 is constituted by a pivot 70a rotatably attached to a substantially cylindrical attachment portion 65a formed in the vehicle body 65 through a bearing 71, a gear portion 70b formed in an upper end portion of the pivot 70a, a hollow portion 70c formed along the axis of the pivot 70a, and driving wheel support portions 70d and 70d provided so as to project obliquely downward in the radial direction from a lower end portion of the pivot 70a.

A wheel 72 is disposed between the driving wheel support portions 70d and 70d, and an axle 73 for supporting this wheel 72 is attached rotatably. In such a configuration, the pivot 70a is disposed perpendicularly to a running plane R, and the axle 73 is horizontally disposed apart from the axis of the pivot 70a at a distance L. In addition, the driving wheel 72 is disposed perpendicularly to the axis of the axle 73 so as to be rotatable along a virtual plane H including the axis of the pivot 70a.

A sprocket wheel 74 is attached to the axle 73. Rotations of a driving wheel driving motor 81 attached to the vehicle body 65 are transmitted to this sprocket wheel 74 through a chain 75, a sprocket wheel 76, a shaft 77, a small bevel gear 78, a large bevel gear 79 and a shaft 80 sequentially as shown in FIG. 13. Consequently, the axle 73 and the driving wheel 72 are driven and rotated by the driving wheel driving motor 81.

On the other hand, a gear 82 having a shaft 83 engages with the gear portion 70b formed in the upper end portion of the pivot 70a, so that rotations of a pivot driving motor 84 attached to the vehicle body 65 are transmitted to the gear portion 70b through this gear 82 and the shaft 83. A driving wheel mechanism 90 is configured in the manner noted above. In addition, at the bottom of the vehicle body 65, as shown in FIG. 12, two driving wheel mechanisms 90 and 90 having the above-mentioned configurations respectively are provided, while two caster-type idler wheels 92 and 92 which can turn desirably are attached. In this case, the driving wheel mechanisms 90 and 90 are disposed on one of the diagonal lines of the bottom of the vehicle body 65, while the idler wheels 92 and 92 are disposed on the other diagonal line.

The operation of the other conventional example configured thus will be described. First, at the time of normal driving, the rotation of the pivot driving motor 84 is controlled by a not-shown fixation device provided in the pivot driving motor 84, and the driving wheels 72 and 72 are rotated in the same direction in the state where the pivotal support member 70 is fixed to the vehicle body 65 as shown in FIG. 12. Consequently, the movable vehicle moves forward in a straight line. If the rotation speeds of the right and left driving wheels 72 and 72 are controlled individually, the vehicle body 65 runs in a curved line.

On the other hand, when the movable vehicle which has advanced straight in the normal driving changes its direction of movement to the right at an angle of 90° so as to move sideways, the pivotal support member 70 fixed by the fixation device is released and the pivot 70a is rotated at an angle of 90° clockwise with respect to the vehicle body 65 when viewed from top as shown in FIG. 14.

In the case of the automatic guided vehicle disclosed in JP-4-2127, a motor is used as a driving source (driving motor 55) so that large torque cannot be provided and the vehicle is not applicable to transportation of a heavy burden which is a target of this invention. Although it can be considered that the capacity of the motor is extended to increase the torque, it is not practical in view of the space and the cost. Although it can be also considered that a reduction unit having a large reduction ratio is provided between the driving wheel 52 and the driving motor 55, it is not practical in view of the cost and the space.

Also in the case of the omnidirectional movable vehicle disclosed in JP-1-37294, the driving wheel driving motor 81 and the pivot driving motor 84 are used as driving sources. Since motors are used as driving sources, satisfactory torque cannot be expected. In order to increase torque, such an extremely complicated mechanism as shown in FIG. 13 is required, and it takes much cost and requires a large space.

When the direction of the vehicle is to be changed in this case, the pivot driving motor 84 is driven to rotate the pivot 70a. However, at this time, the wheels 72 rub the floor surface, so that the vehicle cannot change its direction smoothly. Particularly, in a vehicle transporting a heavy burden, the pivot 70a itself cannot be rotated smoothly.

As has been described, in short, in the case of vehicles shown in the conventional examples, there has been a problem that it is impossible to transport a heavy burden in a condition that the direction can be changed desirably. In order to make it possible to perform transport, an extremely complicated mechanism is required, and the cost is increased.

SUMMARY OF THE INVENTION

The present invention has been achieved to solve the foregoing problems, and an object thereof is to provide a heavy burden transport vehicle the direction of which can be controlled desirably by a simple configuration.

In order to achieve the above object, according to an aspect of the present invention, a heavy burden transport vehicle comprises a plurality of wheels and hydropneumatic units each provided for each of said wheels for driving each wheel, each hydropneumatic unit having a hydropneumatic motor for rotating said wheel, a hydropneumatic pump for feeding compressed operating fluid to the hydropneumatic motor, and a motor for driving the hydropneumatic pump. According to this, it is possible to realize high torque with an extremely simple configuration. In addition, it is possible to control the respective wheels independently of each other, and it is also possible to change their rotation speeds desirably. It is therefore possible to change the direction of the heavy burden transport vehicle desirably. In addition, it is possible to control each of the wheels individually, and to this end, it is sufficient that only each motor and each hydropneumatic pump required therefor are driven. Accordingly, the efficiency is extremely high.

Preferably, the above heavy burden transport vehicle comprises axles each of which has one end side rotatably attached to a vehicle body and the other end side extended downward from the vehicle body so that a corresponding pair of the wheels are disposed on opposite sides of the other end side of the axle. According to this, the direction of an axle can be changed by setting a difference between the rotation speeds of the wheels provided on the opposite side of the axle, and the direction of the axle can be changed on that spot by rotating the wheels oppositely to each other.

Preferably, each of the axles is constituted by a hydropneumatic cylinder, and the heavy burden transport vehicle further comprises a hydropneumatic pump for feeding compressed operating fluid to the hydropneumatic cylinder and a motor for driving the hydropneumatic pump. Therefore, the height of the vehicle can be changed desirably by driving the hydropneumatic cylinder.

Preferably, an accumulator is provided on the way of piping for feeding compressed operating fluid to the hydropneumatic cylinder. According to this, the accumulator can function as shock absorber, so that it is possible to absorb shock given to the axle.

DETAILED DESCRIPTION OF THE PREFERRED EMBODIMENTS

Figure 3:
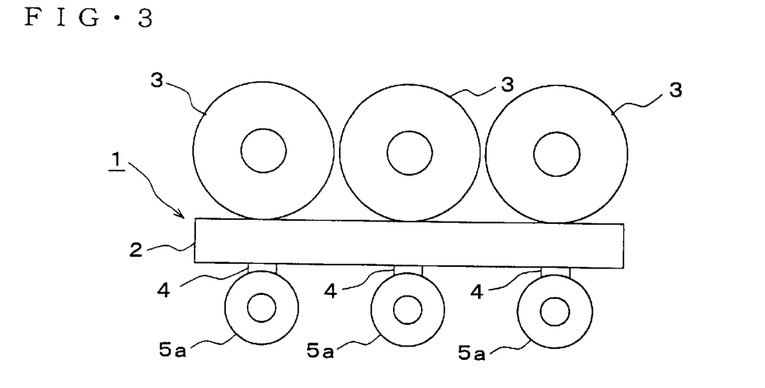
FIG. 3 is a side view of the embodiment of the present invention.
Figure 4:
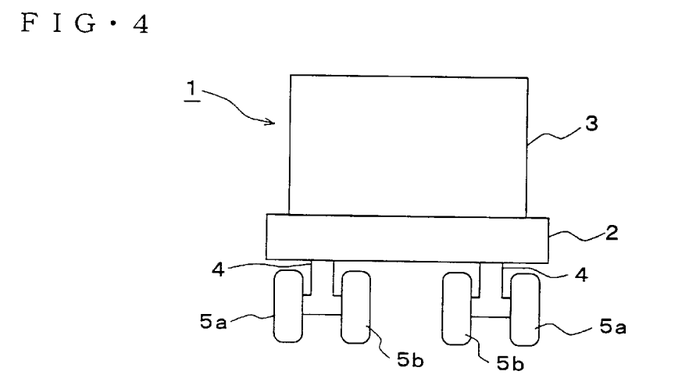
FIG. 4 is a front view of the embodiment of the present invention.
Figure 5:
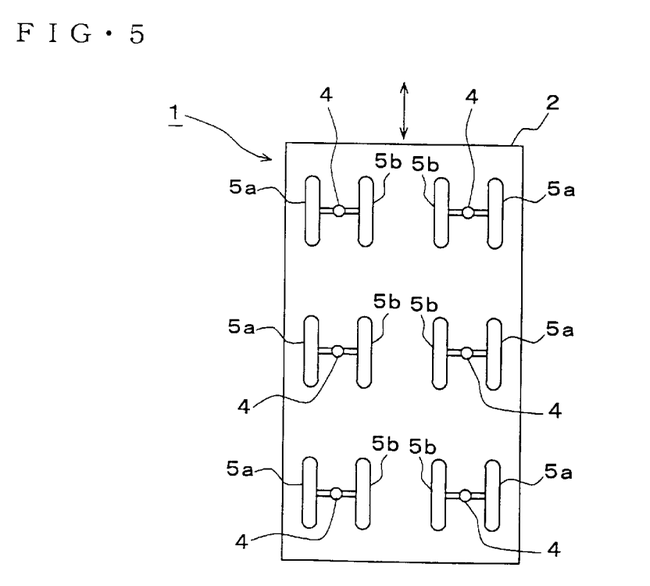
FIG. 5 is a bottom view of the embodiment of the present invention.

First, the outline of the heavy burden transport vehicle will be described with reference to FIGS. 3 to 5. In FIGS. 3 to 5, the reference numeral 1 represents a heavy burden transport vehicle for transporting a heavy burden in a manufacturing line or the like. The heavy burden transport vehicle 1 is usually driven by a driver on a driver seat provided under a body 2 or the like, which will be described later. It may be made possible for the heavy burden transport vehicle 1 to detect markers buried in the road surface so as to run under automatic guidance, or it may be made possible for the heavy burden transport vehicle 1 to run under remote control by a remote controller.

The reference numeral 2 represent a body of the heavy burden transport vehicle; 3, a burden such as coils loaded on the body 2; and 4, an axle having one end side rotatably attached to the body 2 and the other end side extending downward from the body 2. Each axle 4 has an inverted T-shape in the front view, with the lower end extending horizontally on the opposite sides of the axle 4 as shown in FIG. 4.

The reference numerals 5a and 5b represent a pair of wheels attached to each of the axles 4. In each pair of wheels, one disposed outside is shown with the affix 'a' while one disposed inside is shown with the affix 'b'.

In this embodiment, as shown in FIG. 5, six axles are provided, and 12 wheels in total are provided.

Figure 1:
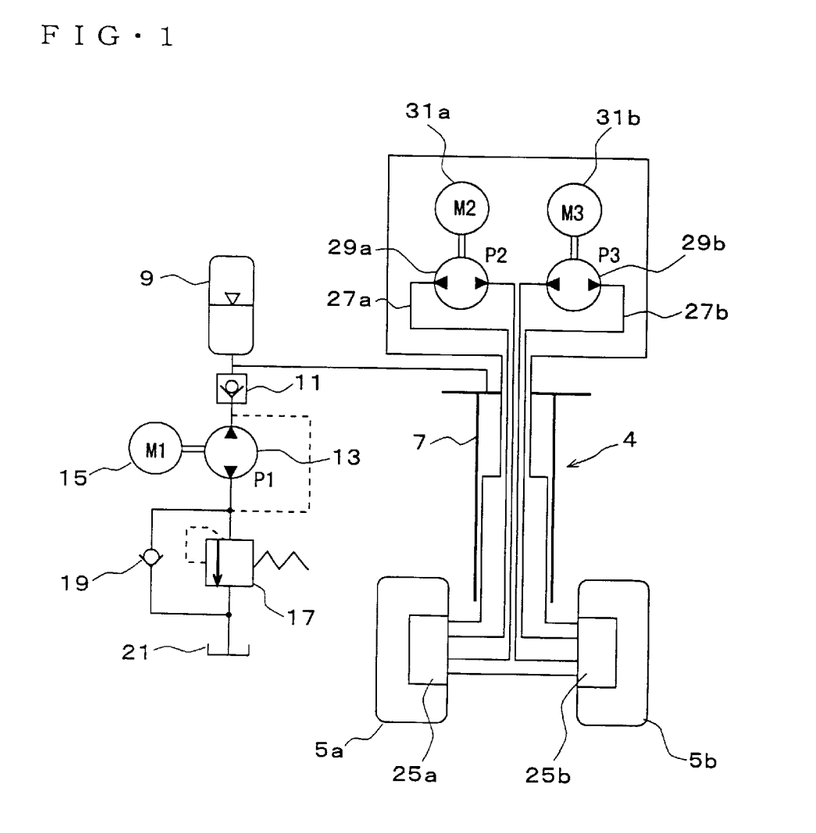
FIG. 1 is a diagram for explaining a main part in an embodiment of the present invention.
Figure 2A:
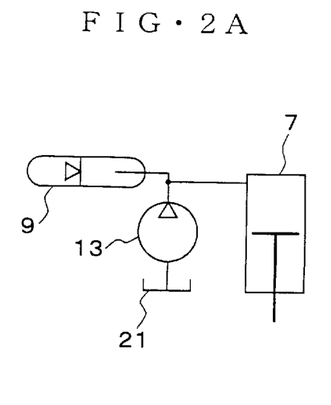
FIGS. 2A–2C are conceptual diagrams of the configuration shown in FIG. 1.
Figure 2B:
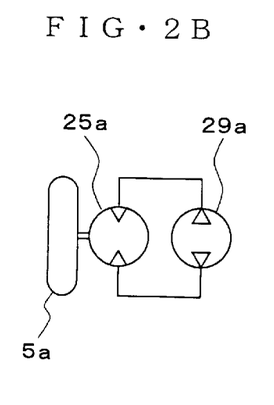
Figure 2C:
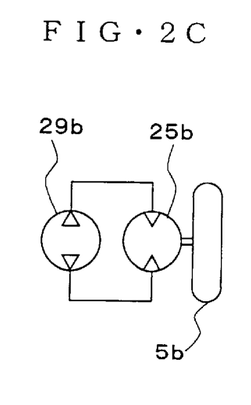

Next, description will be made about a driving system of the wheels 5a and 5b and the axle 4 as a main part of this embodiment with reference to FIG. 1. The heavy burden transport vehicle 1 is provided with three independent hydraulic units for driving the wheels 5a and 5b and the axle 4. FIGS. 2A–2C show this point conceptually. FIG. 2A shows a hydraulic unit for driving the axle 4; FIG. 2B shows a hydraulic unit for driving the outside wheel 5a; and FIG. 2C shows a hydraulic unit for driving the inside wheel 5b.

First, description will be made about the hydraulic unit for driving the axle 4. The reference numeral 7 represents a hydraulic cylinder constituting the axle 4; 9, an accumulator provided on the way of hydraulic piping; 11, a pilot check valve; 13, a hydraulic pump; 15, a motor for driving the hydraulic pump 13; 17, a relief valve; 19, a check valve; and 21, an oil tank.

In the hydraulic unit configured thus, the motor 15 is controlled by external signals. With the motor 15 rotating, the pump 13 is driven, and operating oil is thereby fed into the cylinder 7, so that the cylinder is driven. Then, if the hydraulic pump is rotated normally, the vehicle height can be increased. If the hydraulic pump is rotated reversely to thereby discharge the operating oil into the tank 21, the vehicle height can be reduced.

Though a shock may be caused during the driving due to the roughness of the road surface, this shock can be absorbed by the accumulator 9 functioning as shock absorber.

Next, description will be made about the hydraulic units for the wheels. Although the hydraulic unit for the outside wheel and the hydraulic unit for the inside wheel have the same configuration, constituents of the outside wheel hydraulic unit are shown with the affix 'a', while constituents of the inside wheel hydraulic unit are shown with the affix 'b'.

The reference numerals 25a and 25b represent hydraulic motors provided in the wheels 5a and 5b for driving the wheels 5a and 5b respectively; 27a and 27b, hydraulic pipe arrangements; 29a and 29b, hydraulic pumps for feeding compressed operating oil to the hydraulic motors 25a and 25b through hydraulic pipe arrangements 27a and 27b respectively; and 31a and 31b, motors for driving the hydraulic pumps. These motors 31a and 31b are controlled by external signals.

In the hydraulic units for the wheels configured thus, the hydraulic pumps 29a and 29b are driven by the motors 31a and 31b to feed operating oil to the hydraulic motors 25a and 25b so as to make the wheels 5a and 5b rotate. Since the hydraulic unit for the inside wheel and the hydraulic unit for the outside wheel are constituted independently of each other, the rotations of the wheels can be controlled individually by controlling the rotations of the motors 31a and 31b provided in the respective units.

Through the control of the motors 31a and 31b, the hydraulic pumps 29a and 29b can be rotated at the same rotation speed, at given rotation speeds different from each other, or oppositely to each other. In connection therewith, the wheels 5a and 5b can be rotated at the same rotation speed, at given rotation speeds different from each other, or oppositely. In addition, since the wheels 5a and 5b are oppositely disposed on the both sides of the axle 4, that is, with the axle 4 disposed at a center between the wheels 5a and 5b, if the wheels 5a and 5b are rotated oppositely to each other, the axle 4 can be turned to change the direction of the wheels on that spot. This point is particularly preferable for a vehicle loaded with a heavy burden.

Then, when the axle 4 is to be rotated, the rotation of the axle 4 can be controlled automatically if an encoder for detecting the rotation angle of the axle 4 is provided so that signals from this encoder are used as control signals for the motors 31a and 31b.

In addition, since each axle 4 can rotate in any direction of right and left, it is sufficient that the rotation angle of the axle 4 is set to be 90 degree in the maximum. It is convenient because torsion or the like in the piping caused by rotation of the axle 4 will not occur.

FIGS. 6A–6E are views showing a relationship between the moving direction of the heavy burden transport vehicle 1 and the directions of the wheels. Description will be thereafter made about the relationship between control of the wheels 5a and 5b and the direction control of the heavy burden transport vehicle 1 with reference to FIGS. 6A–6E.

To move the vehicle forward or backward straight, the directions of the wheels are made coincident as shown in FIG. 6 A, and the wheels 5a and 5b are rotated forward or backward at the same rotation speed.

Figure 6A:
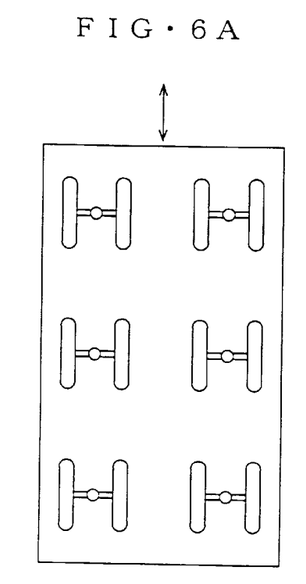
FIGS. 6A–6E are views for explaining the operation of the embodiment of the present invention.
Figure 6B:
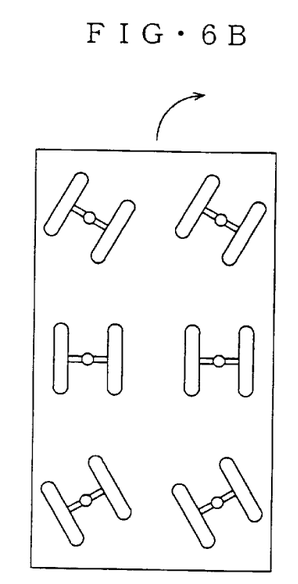

To change the direction of the wheels 5a and 5b, the rotation speeds of the wheels 5a and 5b are made slightly different from each other while the vehicle is moving forward or backward. As a result, since a wheel rotating at a higher speed tries to go more than the other wheel, the axle 4 is turned naturally. When the directions of the wheels thereby become into such a state as shown in FIG. 6B the heavy burden transport vehicle 1 can turn smoothly.

Figure 6C:
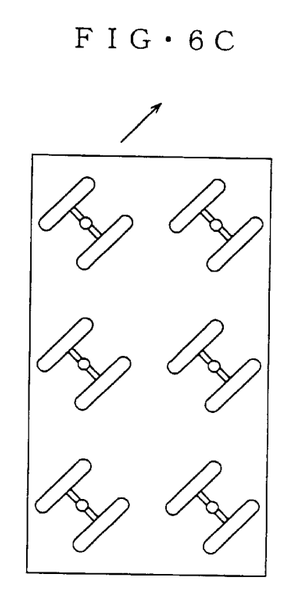

Further, after the wheels 5a and 5b are rotated oppositely to each other so that the axles 4 are turned so as to be brought into such a state as shown in FIG. 6C, if the wheels 5a and 5b are rotated forward or backward at the same rotation speed, the heavy burden transport vehicle 1 can be moved obliquely.

Figure 6D:
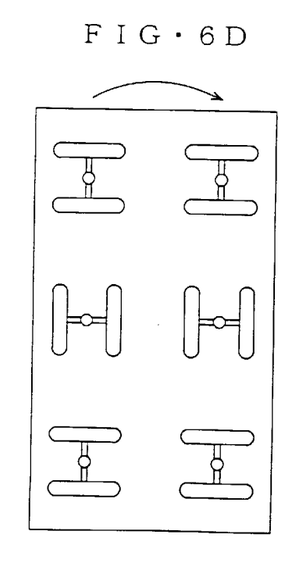

As shown in FIG. 6D, if the axles disposed in the front and rear are rotated by an angle of 90 degrees from their normal state so as to turn sideways and then the wheels disposed in front and rear are rotated oppositely to each other, the heavy burden transport vehicle 1 can be turned on that spot.

Figure 6E:
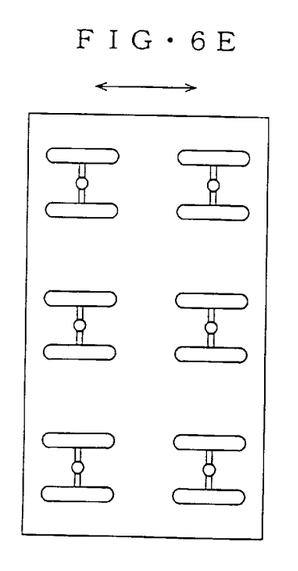

Further, as shown in FIG. 6E, if the wheels 5a and 5b are rotated forward or backward at the same rotation speed in the state where the respective wheels are oriented sideways, the heavy burden transport vehicle 1 can move sideways.

As has been described, according to this embodiment, it is possible to change the rotations of the respective wheels independently and desirably, so that the direction of the heavy burden transport vehicle can be changed desirably. In addition, such control can be made for each of the wheels, and it is sufficient that only motors and hydraulic pumps required for the control are driven, so that the efficiency is extremely high.

Figure 7:
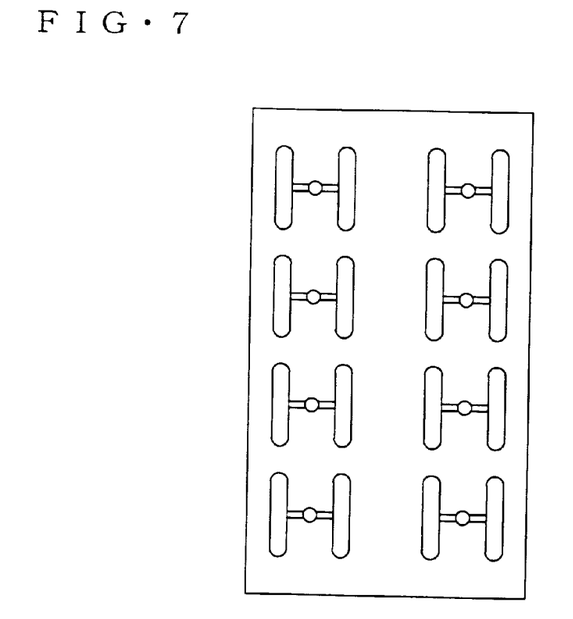
FIG. 7 is a view for explaining another aspect of the embodiment of the present invention.
Figure 8:
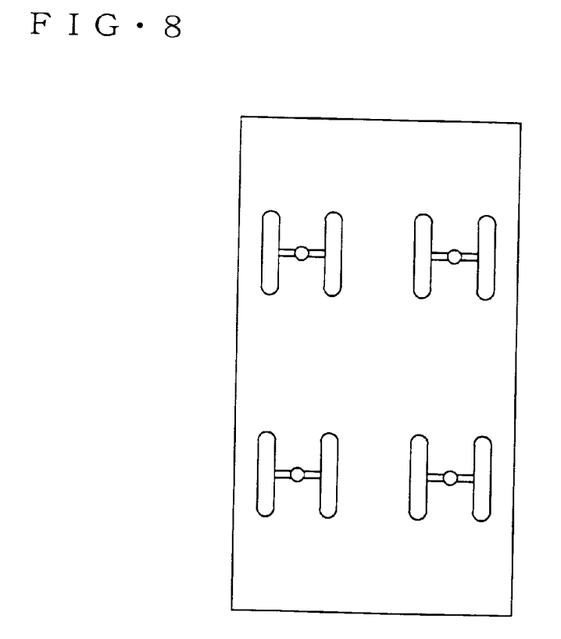
FIG. 8 is a view for explaining another aspect of the embodiment of the present invention.

The above embodiment shows a case where the number of the axles 4 is six and the number of the wheels is 12 by way of example. However, for example, the number of the axles 4 may be 8 and the number of the wheels be 16 as shown in FIG. 7, or the number of the axles 4 may be 4 and the number of the wheels be 8 as shown in FIG. 8.

Figure 9:
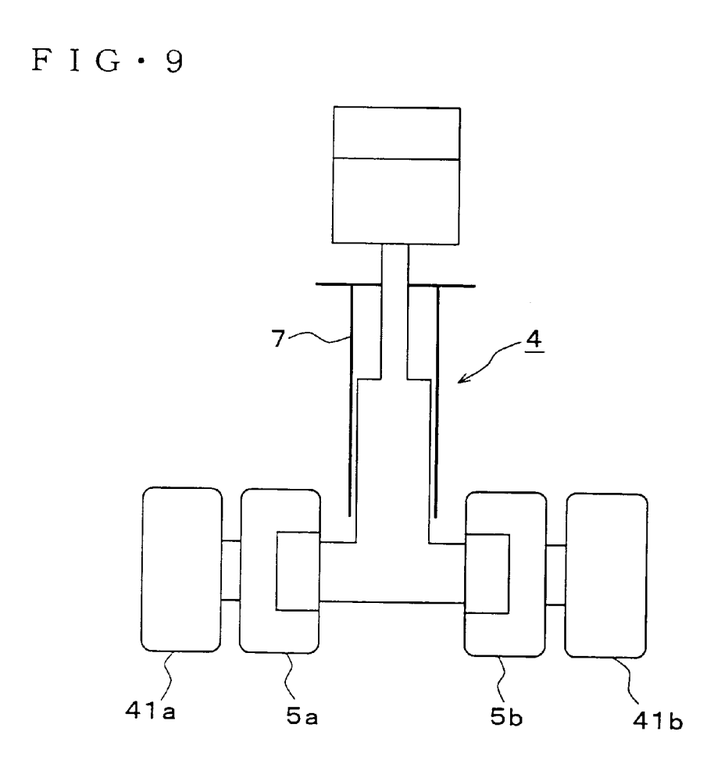
FIG. 9 is a view for explaining another aspect of the embodiment of the present invention.

In addition, if the loading capacity is to be increased, wheels 41a and 41b may be provided outside the wheels 5a and 5b as shown in FIG. 9.

What is claimed is:

1. A heavy burden transport vehicle comprising a plurality of wheels and hydropneumatic units where each of said hydropneumatic units is connected to corresponding one of said wheels in a one-to-one relationship independently from the other for driving each wheel, wherein each hydropneumatic unit is comprised of:

a hydropneumatic motor for rotating said wheel, a hydropneumatic pump for feeding compressed operating fluid to said hydropneumatic motor, and a motor for driving said hydropneumatic pump.

2. A heavy burden transport vehicle according to claim 1, comprising axles each of which has one end side rotatably attached to a vehicle body and the other end side extended downward from said vehicle body so that a corresponding pair of said wheels are oppositely disposed on both sides of said other end side of said axle.

3. A heavy burden transport vehicle according to claim 2, wherein each of said axles is constituted by a hydropneumatic cylinder, and said heavy burden transport vehicle further comprises a hydropneumatic pump for feeding compressed operating fluid to said hydropneumatic cylinder and a motor for driving said hydropneumatic pump.

4. A heavy burden transport vehicle according to claim 3, wherein an accumulator is provided on the way of piping for feeding compressed operating fluid to said hydropneumatic cylinder.

\* \* \* \* \*